United States Patent

Puiello

[11] 3,999,521
[45] Dec. 28, 1976

[54] REFLECTIVE SAFETY HARNESS FOR QUADRUPED ANIMALS

[76] Inventor: Freddie Dave Puiello, 3240 Bay Road, Redwood City, Calif. 94063

[22] Filed: May 14, 1975

[21] Appl. No.: 577,541

[52] U.S. Cl. .............................. 119/96; 40/129 A; 350/98

[51] Int. Cl.² ........................................ A01K 29/00

[58] Field of Search ................ 119/96, 106, 109; 350/98, 298; 40/129 A, 303, 21 C, 300

[56] References Cited

UNITED STATES PATENTS 3,901,579  8/1975  Demerest .................... 350/98

FOREIGN PATENTS OR APPLICATIONS 490,219  1/1930  Germany .................... 119/106
458,518  12/1936  United Kingdom .......... 119/106

Primary Examiner—J.N. Eskovitz
Attorney, Agent, or Firm—Thomas H. Olson

[57] ABSTRACT

A reflective safety harness for a quadruped animal such as a cat or a dog. The harness includes a pair of substantially identical elements that are mounted on opposite sides of the animal, each element having a light reflective surface. Each element includes a semi-flexible sheet that lies against the side of the animal's body and conforms thereto, and a planar member that projects outward and generally normal to the sheet so that it stands out from the animal's body and receives and reflects light impinging thereon. At the corners of the sheet are fastened straps which circumscribe the animal's body at the front and rear of the harness. Extending from the front strap at the top point thereof midway between the two elements is an auxiliary strap having at the distal end thereof a loop through which the dog's regular collar is passed, thereby assuring immovable attachment of the harness on the dog's body.

8 Claims, 5 Drawing Figures

U.S. Patent     Dec. 28, 1976     3,999,521
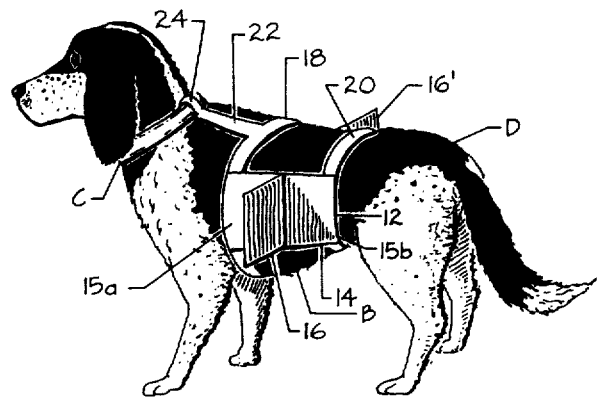
Fig. 1
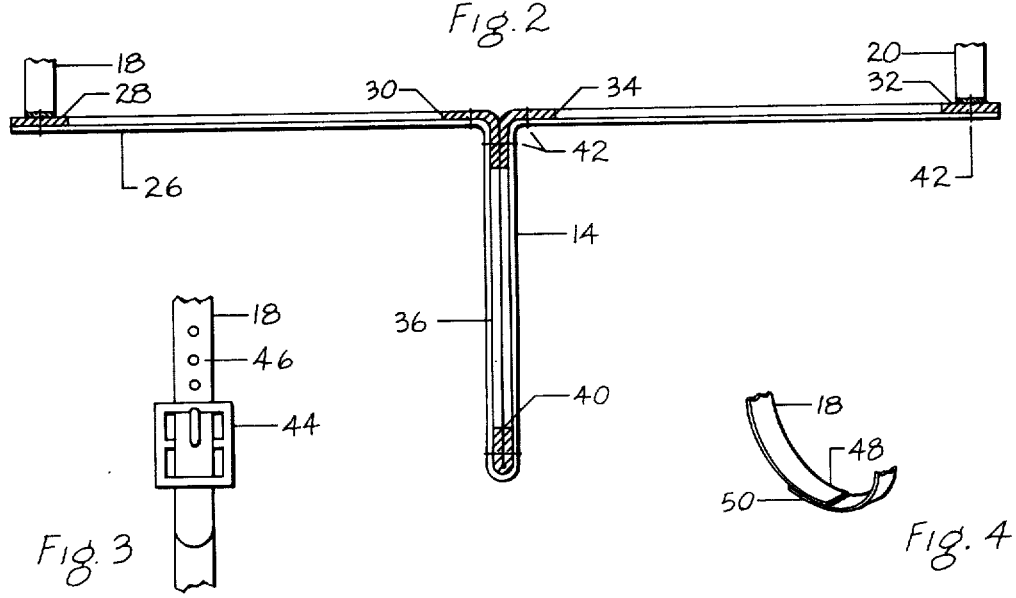
Fig. 2
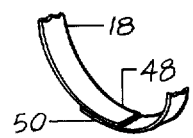
Fig. 3
Fig. 4
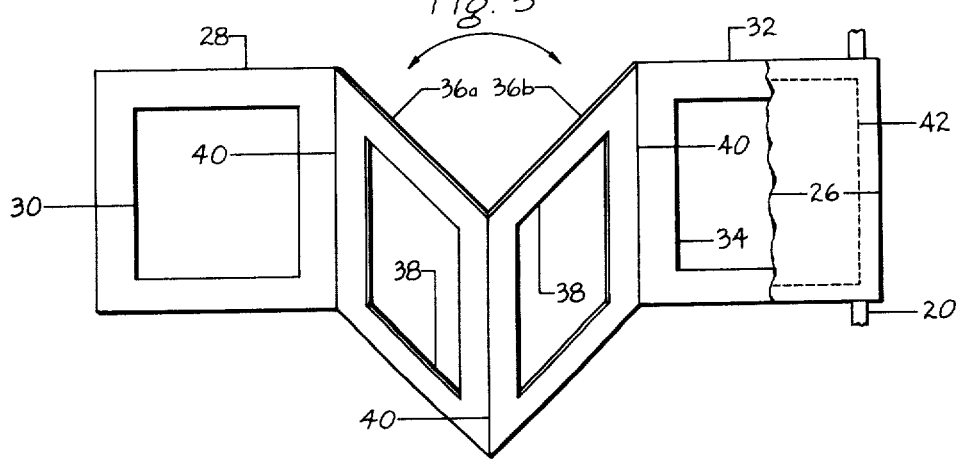
Fig. 5

REFLECTIVE SAFETY HARNESS FOR QUADRUPED ANIMALS

BACKGROUND OF THE INVENTION

1. Field of the Invention

This invention relates to reflective safety harnesses for quadruped animals and more particularly to a reflective structure and means for fixing it onto the animal's body so that light from virtually any angle is reflected by the harness so as to apprise motorists of the location of the animal.

2. Description of the Prior Art

Although various forms of reflective devices for animals and men are disclosed in the prior art, none affords the salutary advantages of the present invention.

SUMMARY OF THE INVENTION

The increased ownership of pets has increased instances of injury to pets and in certain cases has contributed to automobile accidents where motorists see a pet when they are so close to the pet that they can only avoid injuring the pet by swerving or otherwise turning the car in an uncontrolled manner. Moreover, and particularly in urban areas where leash laws are in effect, instances of injury to a person walking a dog at night have occurred. The present invention provides a reflective safety harness that is arranged to reflect light from headlights and the like irrespective of the relative angle between the animal wearing the harness and the direction of light impingement so as to protect animals and owners from serious night accidents.

An object of the invention is to provide a reflective harness that reflects light irrespective of the orientation of the animal to the direction of light impingement. This object is achieved by providing two substantially identical reflective elements that are fastened on opposite sides of the animal and wherein each element has substantial reflective material in two orthogonal or mutually perpendicular planes. Because of the perpendicularity between the reflective planes, it is virtually impossible for the animal to assume a position relative to the direction of light impingement where there will not be substantial light reflection.

Another object is to provide a reflective safety harness of the type referred to above that can be fixed to the animal's body without substantial danger of dislodgment and without impairing the animal's freedom of movement. This object is achieved according to the present invention by providing front and rear straps that totally circumscribe the animal's body at opposite sides of the relatively large diameter belly region or brisket of the animal. The straps thus hold the reflective members in proper operative relationship.

Contributing to attainment of the last stated object is an auxilliary strap extending from the upper central region of the front strap, the auxilliary strap having a loop at its distal end which circumscribes the animal's normal collar. This prevents the safety harness from inadvertent rearward movement on the animal's body even though the animal engages in strenuous movements.

Also contributing to avoidance of interference with the animal's movements is the fact that the reflective members have relatively flexible body engaging sheet portions from the midpoint of which extend a relatively more rigid projecting portion. The central members, because they are relatively flexible, can conform to the animal's body and afford both comfort and elimination of unwanted movement of the harness relative the animal's body. The relatively rigid projecting members assure that the reflective surfaces carried thereby will be in light reflecting relationship to light impinging on the animal in a direction from the front or the rear of the animal.

Still another object is to provide a reflective safety harness that jeopardizes neither the animal's nor bystander's safety. This object is achieved because although the projecting portions are relatively rigid when compared to the body engaging sheets, they have a degree of flexibility sufficient that when they contact persons or fixed objects they will yield without injuring the animal or without adversely affecting the harness structure.

Yet another object of the present invention is to provide a reflective safety harness that is economic to manufacture and sell to the end that it will be universally employed by pet owners. This object is achieved according to the present invention because it can be mass produced by widely available materials and employing automated or semi-automated production techniques. Moreover the overall design of the reflective harness is such that it can be made in different sizes to accommodate animals of different sizes.

The foregoing, together with other objects, features and advantages will be more apparent after referring to the following specification and accompanying drawings.

BRIEF DESCRIPTION OF THE DRAWING

FIG. 1 is a perspective view of a quadruped animal on which a safety harness according to the invention is secured.

FIG. 2 is a fragmentary cross-sectional view of one element of the harness taken along a generally horizontal plane approximately midway of the vertical extremities of the element, the thickness dimensions of the material being exaggerated in the interest of clarity.

FIG. 3 is a view of one form of fastener for securing the straps around an animal's body.

FIG. 4 is a view of another form of fastener for securing the straps in circumscribing relation to an animal's body.

FIG. 5 is a perspective view of one of the elements during an intermediate stage of fabrication thereof and with portions being broken away to reveal internal details.

DESCRIPTION OF THE PREFERRED EMBODIMENT

Referring more particularly to the drawing, reference numeral 12 indicates generally the reflective safety harness of the present invention secured to a quadruped animal, exemplified in the drawing by a dog D. The harness is composed of two identical elements one of which is seen at 14. Element 14 includes a relatively flexible sheet composed of two identical rectangular segments 15a and 15b, from the juncture of which extends in substantially perpendicular relationship a protruding planar member 16. The element on the opposite side of the dog D has an identical protruding element 16'. Element 14 and its counterpart on the opposite side of dog D are retained in place by a front strap 18 and a rear strap 20 which totally circumscribe the animal's body.

The aggregate longitudinal dimension of sheets 15a and 15b is such that straps 18 and 20 circumscribe the dog's body at opposite ends of the relatively large diameter belly portion B of the dog thus assisting in maintaining the harness in place. Also assisting in maintaining the harness in place on the dog's body is an auxilliary strap 22 which extends from the upper midpoint of front strap 18 and has at its distal end a loop 24 through which a conventional neck encircling collar C is passed. Thus, secure attachment of the harness to the body is afforded.

With reference to FIG. 2, element 14 can be seen to be of laminated construction. There is a plastic frame member having a degree of flexibility or resilience on which is secured a reflective fabric layer 26. Fabric 26 is any suitable commercially available reflective material and can be of yellow color, orange color, red color, silver color, or the like.

The base frame of element 14 is formed of plastic sheet material of 16–20 mil thickness which has a degree of resilience sufficient to retain its general shape but is deformable to conform to the curvature of the dog's body and deformable should the dog rub against a solid object. More particularly, the frame is of T-shaped configuration and has a side leg 28 of rectangular shape, the central region being excised at 30 to reduce the weight of the device and to increase the conformability thereof to the animal's body. There is an opposite side leg 32 substantially identical to leg 28, leg 32 being excised at 34 for the same purpose. Integral with side legs 32 and 34 is a double layered central leg 36 which is composed of two layers 36a, 36b of the plastic material. (See FIG. 5). The central leg is excised at 38 to reduce the weight of the structure.

As is clear from FIG. 5, the frame is fabricated from one integral piece of plastic sheet material. After excisions 30, 34 and 38 are made, the plastic is heated at fold lines such as indicated at 40 and deformed or folded into the T-shaped configuration. Layers 36a and 36b are placed in contact with one another and are subjected to heat and pressure, with addition of an adhesive therebetween optional, until a central leg of double thickness and consequent greater rigidity is formed. Thereafter reflective fabric 26 is fastened to the T-shaped frame, the fastening being performed by any suitable expedient such as stitching 42. The stitching preferably totally circumscribes the perimeter of the element and performs the function of securing straps 18 and 20 to element 14 and to its counterpart on the opposite side of the dog. (See FIG. 2).

To recapitulate, side legs 28 and 32 of each element are of single layer construction and therefore have a degree of flexibility sufficient to conform to the curvature of the dog's body; central leg 36 is of double layer construction so that it is relatively more rigid and supports the reflective material on planar member 16 in the extending position shown in FIG. 1.

It is preferable that straps 18 and 20 have fastening means at the lower or belly portion of the dog's body. In FIG. 3 the fastening means is exemplified by a buckle 44, one side of strap 18 having a row of punched holes 46 for adapting the harness to dogs of different sizes.

FIG. 4 shows an alternate form of strap engaging means, the same being a Velcro fastener of the type described in somewhat more detail in the above cited U.S. Pat. No. 3,276,416. The Velcro material has a portion 48 of matted elongate fibers and a portion 50 which is made up of a large plurality of very small hook shaped pieces that engage the fibers on portion 48 in a well known manner. As is known, the Velcro material can be interengaged at one of many positions to afford the degree of adjustability necessary to accommodate the harness to animals of different sizes.

A device embodying the invention is fabricated by first cutting out a plastic sheet of semi-rigid material in the form shown in FIG. 5, the excisions being made of suitable size to lighten the weight of the device without adversely impairing the strength thereof. Thereafter reflective fabric 26 is attached to the generally T-shaped elements by stitching around the perimeter, the stitching also securing straps 18 and 20 to the identical T-shaped elements. The completed harness is then installed onto the dog by releasing the fasteners, be they buckles 44 or Velcro fasteners 48, 50 so that straps 18 and 20 can be passed under the dog's belly. The fasteners are then tightened and engaged so as to retain the device in the correct operative condition as shown in FIG. 1. Auxilliary strap 22 can be engaged by removing the dog's collar, passing the collar through loop 24 and then refastening the collar in circumscribing relation to the animal's neck. Auxilliary strap 22 prevents rearward movement of harness 12 on the animal's body; forward movement is prevented by strap 20 because it circumscribes the loin region of the animal's body that has a smaller diameter than the animal's body has forward such region.

Auxilliary strap 22 as well as front and rear straps 18 and 20 can be advantageously surfaced with reflective material so as to improve further the visibility of the animal on which the harness of the invention is installed.

It will be apparent that as the animal moves about, light impinging from virtually any direction will be reflected by fabric 26 so as to give warning to a motorist who approaches the dog during the nightime. That is to say if the motorist approaches the dog from the side of the dog, sheets 15a and 15b will reflect light back to the motorist and inform him of the dog's presence. Should, however, the motorist approach the dog from either the front or the back, a position in which side panels 15a and 15b are virtually invisible, the protruding planar member 16 and the reflective fabric surface thereof reflects light back to the motorist and alerts him to the dog's position.

Because the reflective fabric is flexible and the frame on which the fabric is secured is semi-flexible the side legs 28 and 32 of the T-shaped elements can assume sufficient curvature when straps 18 and 20 are tightened to conform to the curvature of the dog's body. However, the relatively rigid central leg 36, being of double laminated structure, is sufficiently rigid to maintain its position of perpendicularity to the side legs or sheets that lie against the dog's body. The double layered central leg 36 is not so rigid, however, that injury will occur should the dog brush up against a child, for example, while wearing the harness. The harness will yield sufficient to avoid injury to the child and to the dog.

Thus it will be seen that the present invention provides a reflective safety harness that is simple and economical in construction, convenient to put onto and remove from the dog, and active to reflect light irrespective of the angle from which the light impinges onto the harness when in place on the dog. Moreover the device is of a sufficiently flexible construction that injury to the dog or bystanders will not occur should there be an inadvertent impact therebetween.

It should be understood that the invention can be made in a variety of sizes to accommodate any animal from a small cat to a large dog or even to a horse or like large quadruped animal. Although one embodiment has been shown and described it will be obvious that other adaptations and modifications can be made without departing from the true spirit and scope of the invention.

What is claimed is:

1. A reflective safety harness for a quadruped animal comprising first and second semi-flexible planar members each having two opposite mutually parallel light reflective surfaces and means for securing said members onto the respective sides of the animal's body so that the members reside in a plane substantially transverse of the animal's body and project outward from the sides of the animal's body.

2. A harness according to claim 1 wherein each said planar member comprises a semi-flexible planar frame having first and second opposite mutually parallel faces, first and second pieces of reflective fabric, means for attaching said pieces of fabric to respective faces of said frame, and means for fastening each said frame to an opposite side of the animal's body.

3. A harness according to claim 2 wherein each said planar frame has an edge, two side legs integral with said frame and extending in opposite directions from said edge in a generally T-shaped configuration, said fabric pieces having extensions substantially coextensive with said legs and secured thereto, said frame being relatively stiffer than said side legs, said fabric pieces forming a reflective surface over said frame and said central leg and means for retaining said side legs and said extensions against the side of the animal's body.

4. A harness according to claim 3 wherein said retaining means comprises straps fixed to the front and rear extremities of the legs, and means for engaging the straps in circumscribing relation to the animal's body at opposite extremities of said legs.

5. A harness according to claim 4 wherein said engaging means includes a buckle on said strap.

6. A harness according to claim 4 wherein said engaging means includes Velcro fastening material fixed to said straps and engageable to retain the straps in circumscribable relation to the animal's body.

7. A harness according to claim 3 wherein said frame and legs are formed of sheet plastic folded so that said frame is of double thickness, central regions of said frame and said side legs being excised to form excisions, and means for securing said reflective fabric to said side legs and said frame so that said fabric piece spans said excisions.

8. A harness according to claim 4 including means extending forward from said engaging means for effecting a connection to a neck circumscribing collar worn by the animal, said effecting means acting to retain said harness in position.

* * * * *